(12) United States Patent
Lee et al.

(10) Patent No.: US 7,634,071 B2
(45) Date of Patent: Dec. 15, 2009

(54) AUTO SWITCH SYSTEM AND METHOD THEREOF FOR IP PHONE AND DEFAULT AUDIO DEVICE

(75) Inventors: Chien-Chung Lee, Hsin-Chu Hsien (TW); Shao-Pin Chiang, Hsin-Chu Hsien (TW)

(73) Assignee: Getac Technology Corporation, Hsinchu (TW)

( * ) Notice: Subject to any disclaimer, the term of this patent is extended or adjusted under 35 U.S.C. 154(b) by 883 days.

(21) Appl. No.: 11/084,182

(22) Filed: Mar. 21, 2005

(65) Prior Publication Data

US 2006/0210042 A1  Sep. 21, 2006

(51) Int. Cl.
*H04B 1/00* (2006.01)
*H04M 9/00* (2006.01)

(52) U.S. Cl. ............................. 379/110.01; 379/387.01

(58) Field of Classification Search .............. 379/93.07, 379/110.01, 387.01; 455/561; 370/352, 370/353
See application file for complete search history.

(56) References Cited

U.S. PATENT DOCUMENTS

| 6,510,210 B1 * | 1/2003 | Baughan | 379/90.01 |
| 6,993,004 B2 * | 1/2006 | Boys | 370/338 |
| 2005/0071626 A1 * | 3/2005 | Bear et al. | 713/100 |

FOREIGN PATENT DOCUMENTS

CN  2411158 Y  12/2000

* cited by examiner

*Primary Examiner*—Fan Tsang
*Assistant Examiner*—Mohammad K Islam
(74) *Attorney, Agent, or Firm*—Quintero Law Office, PC

(57) ABSTRACT

An auto switch system and method thereof for IP phones and default audio devices. The system may automatically switch voice output of an information apparatus between the IP phone and the audio device according to IP phone usage. Thus, inconvenience caused by the IP phone being set as the default output is overcome. Furthermore, users need not change the settings when using IP phones.

17 Claims, 5 Drawing Sheets

AUTO SWITCH SYSTEM AND METHOD THEREOF FOR IP PHONE AND DEFAULT AUDIO DEVICE

BACKGROUND

1. Field of Invention

The invention relates to an auto switch system and method thereof for IP phones and default audio devices, and in particular to a switch system and method thereof that can be applied in information devices that switch voice output automatically according to IP phone usage.

2. Related Art

The development of the Internet has enabled people to communicate with one another not only by E-mail but also IP phone. For example, people can talk to each other through information apparatus (ex. PC or server) and Internet directly by IP Phone 7900 series products launched by Cisco. Thus, the cost for long distance communication is considerably reduced.

However, the main drawback of IP phones on the market is that the user's voice is outputted from the IP phone, not from the audio device, when the information apparatus is installed with an IP phone, regardless of whether the information apparatus is connected by an IEEE 1394 or USB interface. All audio data is outputted from the IP phone no matter whether the IP phone is used or not.

This may not cause any problems for business users because servers or public computers need not output audio data or play music files in any format. But for individual users, multimedia play is a major demand. When playing multimedia files, the voice will not be outputted from the default audio device (ex, speaker). If playing music and using the IP phone simultaneously, communication is interfered with because all audio data is outputted from the IP phone. The current solution is to change settings (from IP phone to default audio device) in the operation system manually. This operation is inconvenient and complicated for the primary users.

SUMMARY

The problems to be solved are the inconvenience caused by setting changes when the IP phone is connected to the information apparatus, and the fact that the audio settings need to be changed when the IP phone is not in use.

In view of foregoing problems, an auto switch system for an information apparatus having an IP phone and a default audio device is provided. The system includes a detecting module and a switch module. The detecting module is for detecting an on-off signal from the IP phone while the switch module is for switching the audio output of the information apparatus between the IP phone and the default audio voice in response to the on-off signal. When the on-off signal is an ON signal, the audio output is switched to the IP phone; when the on-off signal is an OFF signal, the audio output is switched to the default audio device.

In another aspect, an auto switch method for an information apparatus having an IP phone and a default audio device is also provided. The steps include detecting an on-off signal of the IP phone; justifying if the on-off signal is an ON signal; and outputting audio data from the IP phone. When the on-off signal is an OFF signal, audio data is outputted from the default audio device.

The audio output of the information apparatus may be switched automatically between the IP phone and the default audio device according to the usage of the IP phone. Thus, the IP phone is more convenient to use.

In the following description numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

BRIEF DESCRIPTION OF THE DRAWINGS

The above and other objects, features and other advantages of the invention will be more clearly understood from the following detailed description when taken in conjunction with the accompanying drawings, in which.

DETAILED DESCRIPTION

Figure 1:
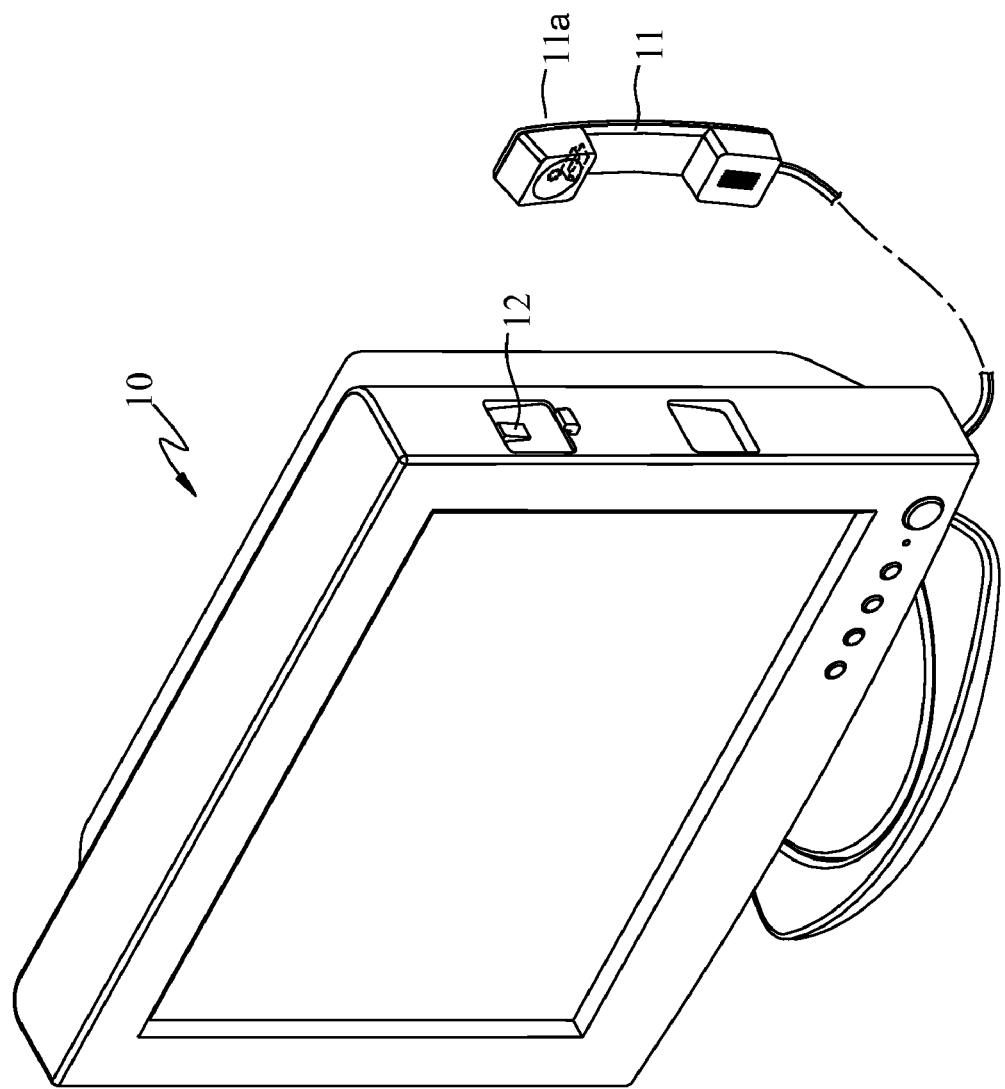
FIG. 1 illustrates the schematic view of a computer having an IP phone according to the embodiment of the invention.

Reference will now be made in greater detail to a preferred embodiment of the invention, an example of which is illustrated in the accompanying drawings. Wherever possible, the same reference numerals are used throughout the drawings and the description to refer to the same or like parts. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

An auto switch system and method thereof are provided for the operation system of an information apparatus. The IP phone switch of the IP phone is employed to provide usage status (in use or hang up) of the system to change audio output settings.

Refer to FIG. 1. The auto switch system 100 according the embodiment of the invention is installed in the computer host 10 having an IP phone 11. IP phone 11 includes an audio output device 11a. The computer host 10 is an information apparatus integrating a host in the LCD. The IP phone 11 is hung on the touch IP phone switch 12 on the computer host 10 such that the usage status of the IP phone 11 is determined though the function of the IP phone switch for audio output settings.

Figure 2:
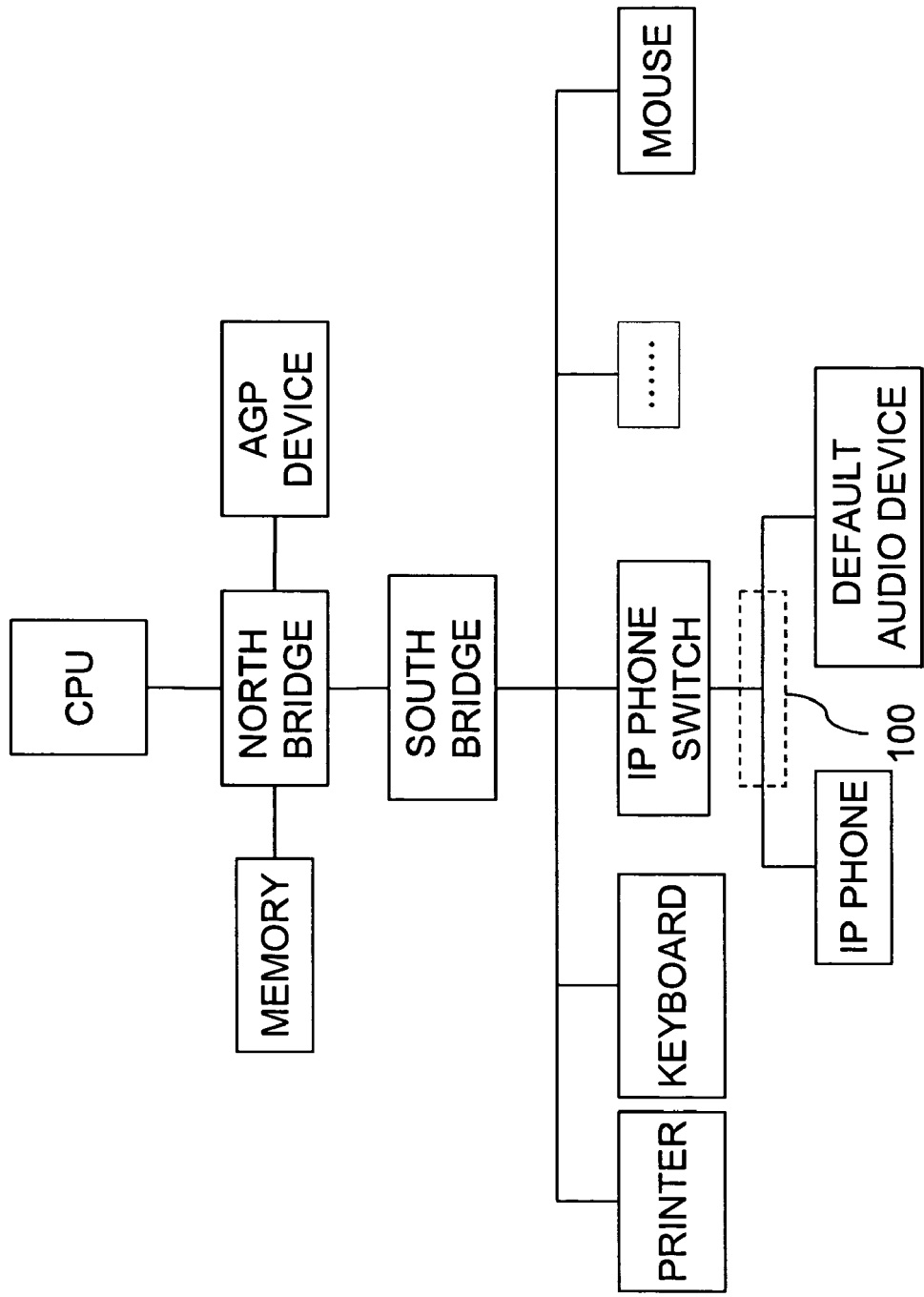
FIG. 2 illustrates the system architecture of the computer in FIG. 1.

The system architecture of the computer host 10 is illustrated in FIG. 2. The south bridge chipset, the IP phone, and the default audio device are controlled by the auto switch system 100 through the on-off signal, including ON signal and OFF signal, which is generated by the IP phone switch. When a user holds or hangs up the IP phone, the auto switch system 100 receives an on-off signal to change the audio settings of the computer host as the IP phone or the default audio device. The default audio device hereinafter is the default audio output device of the information apparatus before an IP phone is installed, for instance, a speaker or earphone.

Figure 3:
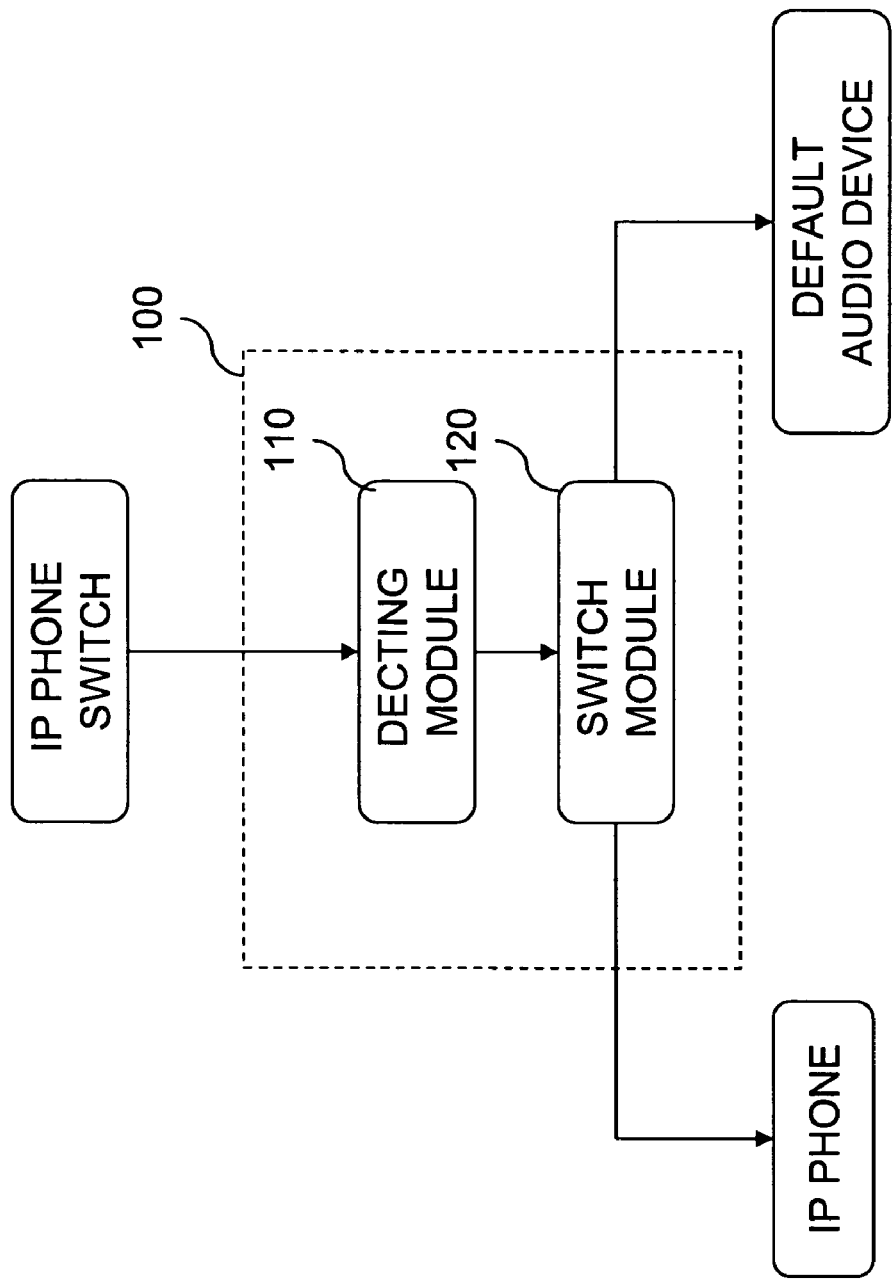
FIG. 3 illustrates the block diagram of the auto switch system for IP phones and default audio devices in accordance with the invention.

Refer to FIG. 3. The system architecture of the auto switch system is illustrated in detail in the following.

The detecting module detects the on-off signal from the IP phone 11. The on-off signal may be an ON signal, indicating that the IP phone is in use, or an OFF signal, indicating that the IP phone is hung up. The ON signal and the OFF signal are generated by the IP phone switch 12.

The switch module 120 changes the audio setting of the computer host 10 according to the ON signal or the OFF signal such that the audio device of the computer host 10 is switched between the IP phone and the default audio device.

Although a computer host is used for illustration, other information apparatuses installed with IP phones, such as PCs, servers, notebooks or PDAs may be implemented with the invention. The IP phone switch 12 is not limited in the embodiment. Besides the embodiment in FIG. 1, the switch may be provided at the power button of the IP phone. The connection between the IP phone and the computer host is still coupled between the south bridge chipset (peripheral control module) and the default audio device. Thus, through the ON or OFF signal of the IP phone, the usage status of the IP phone is used as the basis for change of the audio output setting.

Figure 4:
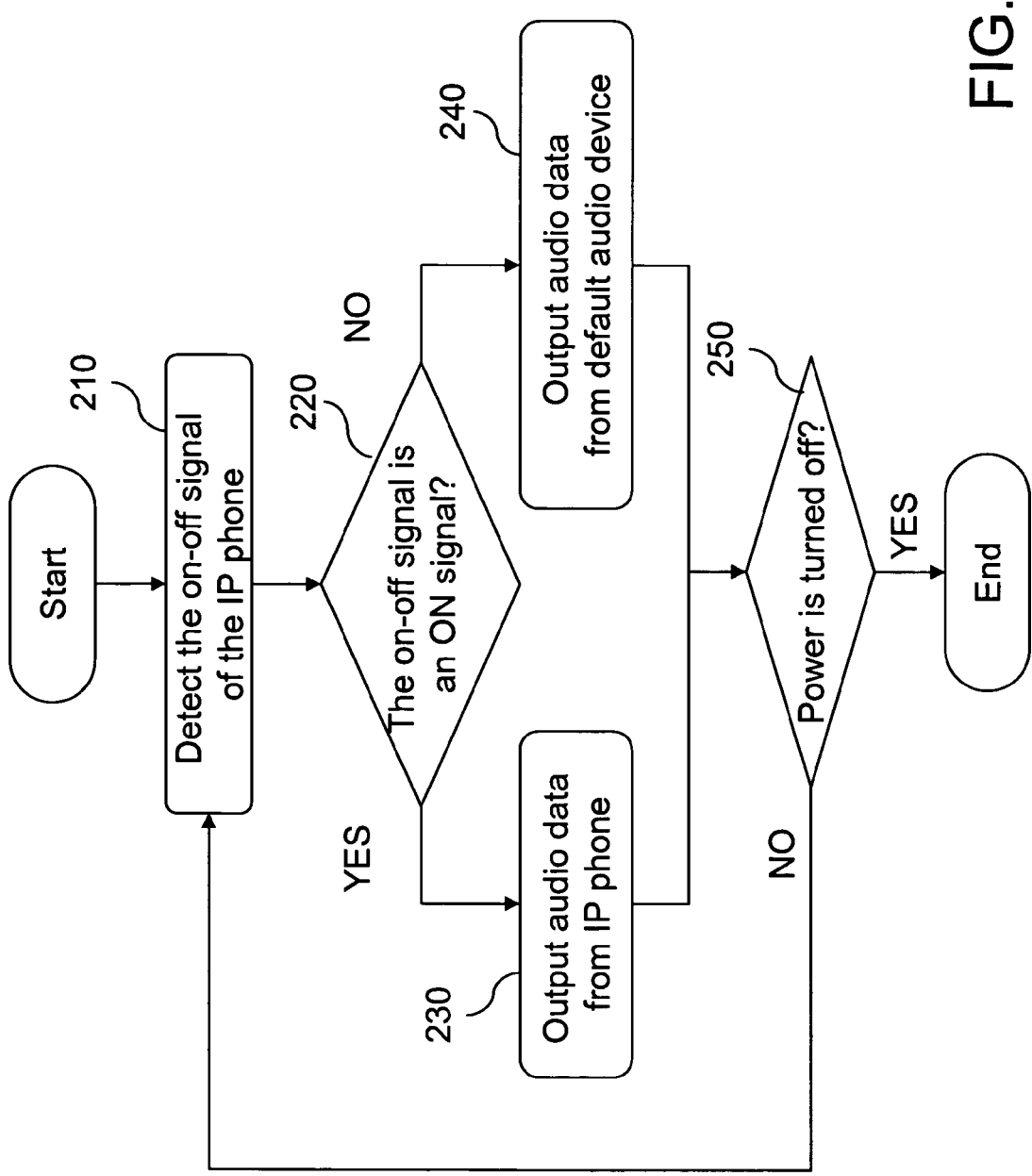
FIG. 4 illustrates the flow chart of the auto switch method for IP phones and default audio devices in accordance with the invention.

Refer to FIG. 4 illustrating the flow chart of the invention.

The on-off signal of the IP phone is detected (step 210) and processed by the detecting module 110. As mentioned above, the on-off signal is generated by the IP phone switch 12 of the IP phone 11 when in communication or when hung up. The IP phone switch 12 is connected between the south bridge chipset (peripheral control module) and the default audio device such that the ON signal or OFF signal may be detected by the detecting module 110.

Then, the switch module 120 verifies whether the on-off signal is an ON signal or not (step 220). On or Off of the IP phone switch 12 generates a '0' or '1' signal. When the on-off signal is verified as an ON signal of the IP phone switch 12, the switch module defines the IP phone 11 as the audio device of the computer host 10 (step 230). The IP phone is then employed to output audio data.

When the on-off signal is an OFF signal, the switch module defines the default audio device as the audio device of the computer host 10 (step 240). The default audio device is then employed to output audio data.

However, no matter which is the audio device, detection is performed continuously. Otherwise, the power of the computer host 10 is tuned off, as step 250 of verifying if the power is turned off.

Figure 5:
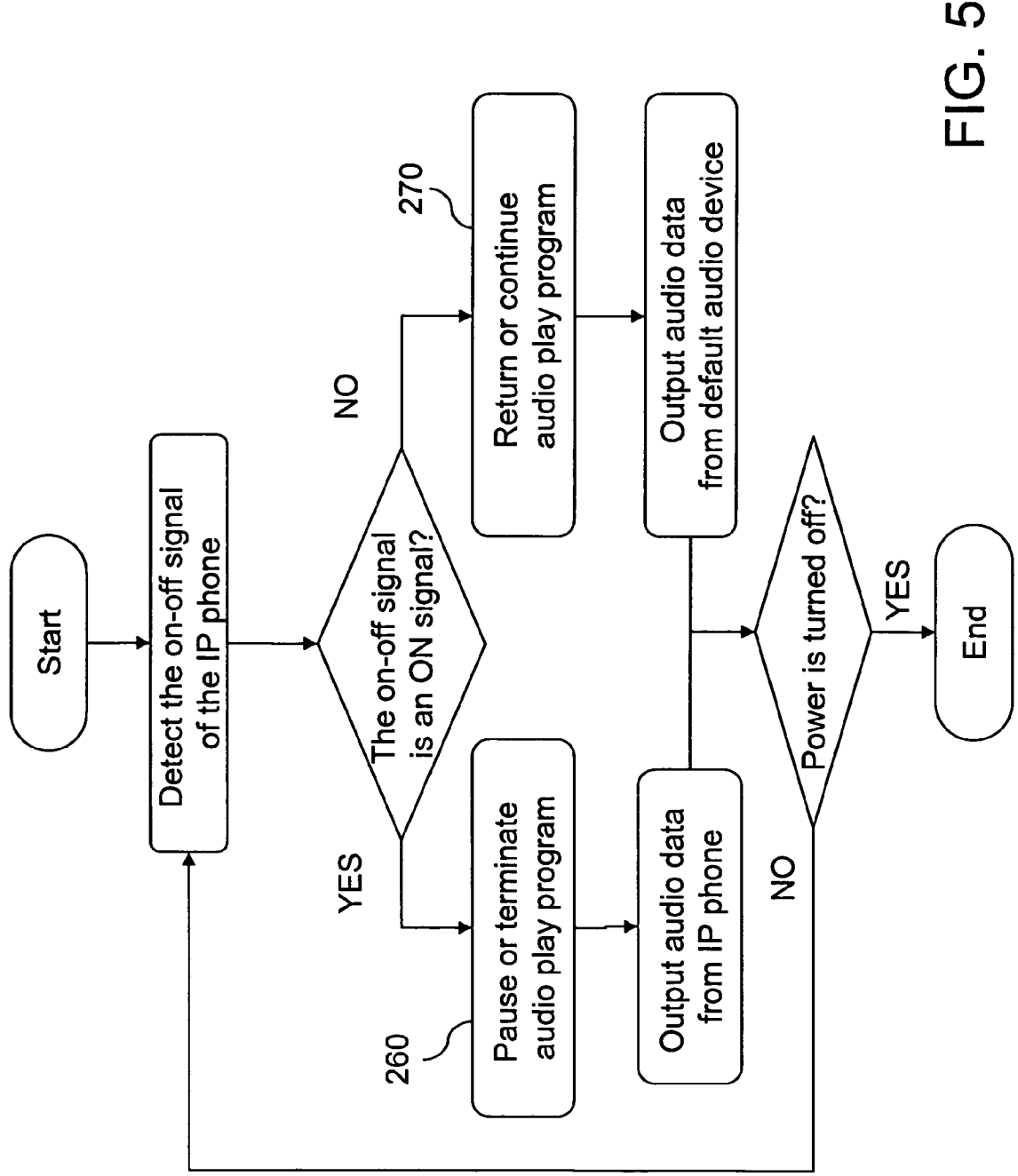
FIG. 5 illustrates another flow chart of the auto switch method for IP phones and default audio devices in accordance with the invention

If audio data is outputted from the IP phone, the program needs to be paused or terminated. After the IP phone is used, audio settings are returned to the default audio device and the audio and video files are played again. Refer to step 260 of pausing or terminating audio play program and step 270 of returning or continuing to play audio program in FIG. 5 for this operation.

Once the handset of the IP phone is picked up, an ON signal is generated by the IP phone switch. The provided system and method thereof may detect and switch automatically such that the audio setting is change as the IP phone. When the handset of the IP phone is hung up, an OFF signal generated by the IP phone switch enables the audio setting to be changed to the default audio device.

Besides using the IP phone switch 12 (or power button) mentioned above to generate the on-off signal, software is also employed to generate the on-off signal. In this embodiment, when the IP phone 11 is in use and corresponding IP phone software is activated, a corresponding figure indicating current usage of the IP phone 11 is generated by the operation system of the computer host 10. The ON signal is delivered to the detecting module 110 through the IP phone software. When the IP phone is hung up and the program is terminated, the IP phone program issues the OFF signal to the detecting module 110.

The operation of the switch module 120 is similar with the above mentioned embodiment. The detecting module 110 and the switch module 120 may be implemented by hardware or software and are not limited in this embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An auto switch system for an information apparatus having an IP phone capable of outputting audio and a separate default audio device, comprising:
    a detecting module for detecting an on-off signal automatically provided from the IP phone, wherein the on-off signal is an ON signal when the IP phone is in use and an OFF signal when the IP phone is hung up; and
    a switch module for switching the audio output of the information apparatus between the IP phone and the default audio voice in response to the on-off signal;
    wherein when the on-off signal is the ON signal, the audio output is switched to the IP phone such that the audio is outputted from an audio output device of the IP phone; and
    when the on-off signal is the OFF signal, the audio output is switched to the default audio device such that the audio is outputted from the default audio device.

2. The auto switch system of claim 1, wherein the on-off signal is provided from an IP phone switch, and the IP phone switch automatically generates the ON signal when the IP phone is in use and the OFF signal when the IP phone is hung up.

3. The auto switch system of claim 2, wherein the IP phone switch is coupled between the default audio device and a peripheral control module of the information apparatus.

4. The auto switch system of claim 3, wherein the peripheral control module is a south bridge chipset.

5. The auto switch system of claim 1, wherein the on-off signal is provided by an IP phone software, and IP phone software automatically generates the ON signal when the IP phone is in use and the OFF signal when the IP phone is hung up.

6. The auto switch system of claim 1, wherein the audio device is a speaker or an earphone.

7. An auto switch method for an information apparatus having an IP phone capable of outputting audio and a separate default audio device, comprising:
    detecting an on-off signal automatically provided from the IP phone, wherein the on-off signal comprises an ON signal when the IP phone is in use and an OFF signal when the IP phone is hung up;
    justifying if the on-off signal is the ON signal;
    wherein, when the on-off signal is the ON signal, outputting the audio data from the IP phone such that the audio is outputted from an audio output device of the IP phone; and
    when the on-off signal is the OFF signal, outputting the audio data from the default audio device such that the audio is outputted from the default audio device.

8. The auto switch method of claim 7, wherein the on-off signal is provided from an IP phone switch, and the IP phone switch automatically generates the ON signal when the IP phone is in use and the OFF signal when the IP phone is hung up.

9. The auto switch method of claim 8, wherein the IP phone switch is coupled between the default audio device and a peripheral control module of the information apparatus.

10. The auto switch method of claim 9, wherein the peripheral control module is a south bridge chipset.

11. The auto switch method of claim 7, wherein the on-off signal is provided by an IP phone software, and IP phone software automatically generates the ON signal when the IP phone is in use and the OFF signal when the IP phone is hung up.

12. The auto switch method of claim 7 further comprises a step of pausing an video play program or an audio play program before outputting audio data from the IP phone.

13. The auto switch method of claim 7 further comprises a step of terminating an video play program or an audio play program before outputting audio data from the IP phone.

14. The auto switch method of claim 7 further comprises a step of continuing an video play program or an audio play program before outputting audio data from the IP phone.

15. The auto switch method of claim 7 further comprises a step of returning an video play program or an audio play program before outputting audio data from the IP phone.

16. The auto switch method of claim 7, wherein the audio device is an earphone.

17. The auto switch method of claim 7, wherein the audio device is a speaker.

* * * * *